April 12, 1960 P. GREGER 2,932,242
CAMERA WITH EXPOSURE METER
Filed July 10, 1958
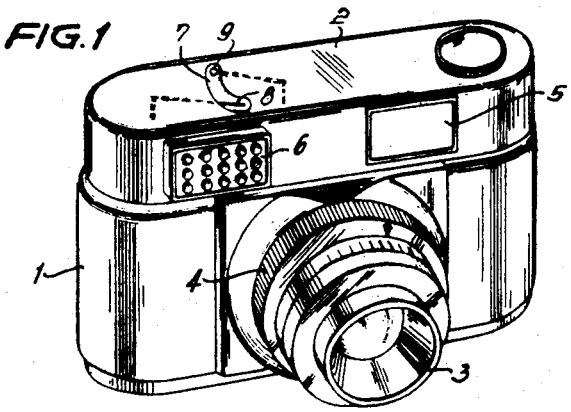
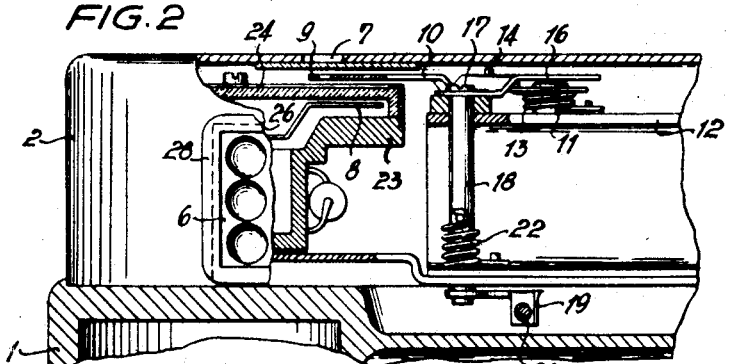
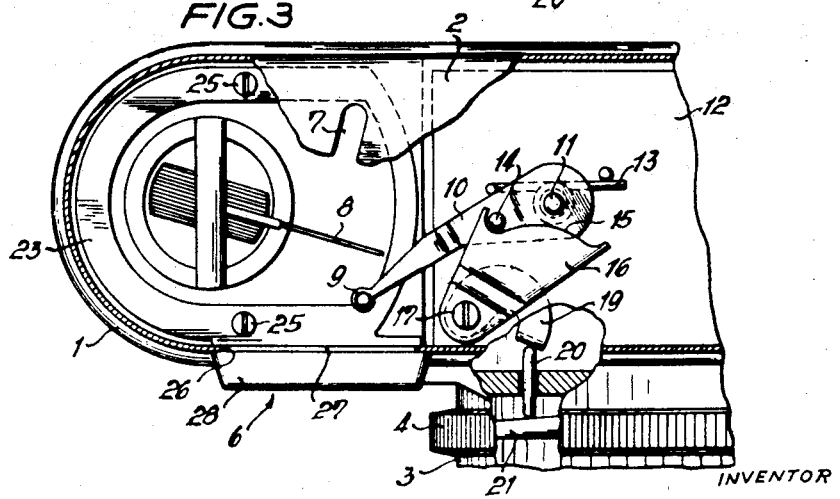
INVENTOR
Paul Greger
By Blum, Moscovitz, Friedman & Blum
Attorneys the camera cap when the latter is applied to the camera. In order to have a dustproof seal between the mount for the light-sensitive cell and the camera cap, it is of advantage to provide said mount with a groove which is sealingly entered by the edges of said recess provided in the camera cap.

United States Patent Office 2,932,242
Patented Apr. 12, 1960

2,932,242
CAMERA WITH EXPOSURE METER

Paul Greger, Braunschweig, Germany, assignor to Voigtländer A.G., Braunschweig, Germany, a corporation of Germany Application July 10, 1958, Serial No. 747,710

Claims priority, application Germany September 10, 1957

2 Claims. (Cl. 95—10)

This invention relates to a photographic camera having a built-in electric exposure meter and it has particular relation to photographic cameras of this type, in which a follow-up mark coupled with the members for adjustment of the shutter, is adjustable to the deflection of the pointer of the exposure meter and in which the exposure meter and the mechanism of the follow-up mark are built-in in the camera as structural units which are mechanically separated from each other, but are fully capable of functioning, each by itself.

It is one of the objects of the present invention to provide a photographic camera of the above outlined type, in which the exposure meter and the mechanism of the follow-up mark are arranged spatially separated, side-by-side.

It is another object of the present invention to provide a photographic camera, in which an exposure meter manufactured by a special manufacturer can be easily built-in in combination with the mechanism of the follow-up mark and the exposure meter can be easily exchanged, if necessary.

A further object of this invention is to provide a photographic camera, in which the exposure meter consists of a structural unit having a dustproof seal.

In carrying out the present invention, the mechanism of the follow-up mark and its connection with the members for adjusting the shutter can be of any desired type. For example, the follow-up mark may move along a straight or circular path.

It has been found to be of advantage if the follow-up mark forms the free end of a lever arm which is swingable about a stationary pivot arranged in the camera, whereby said pivot is located outside the circular path of the pointer tip of the exposure meter. Due to the spatially separate arrangement of the exposure meter and follow-up mark mechanism, the manufacturer of the camera can easily build-in an exposure meter delivered by a special manufacturer. Furthermore, in case of defects or repairs the exposure meter built-in in the camera can be easily exchanged with an intact exposure meter.

In view of the absence of operative connections between the exposure meter and the follow-up mark mechanism, the exposure meter may be a sealed, dustproof instrument provided with a transparent disc above the range of movement of its pointer, the path of movement of the follow-up mark extending beyond said disc.

After insertion of the exposure meter (which has been correctly adjusted, or set, by itself), its adjustment relative to the follow-up mark may be necessary, whereby the setting or adjusting member is preferably a part of the follow-up mark mechanism.

As already mentioned above, in carrying out the invention the exposure meter is built-in in the camera as a structural unit which is closed and fully operative by itself. Thus, seated on the exposure meter casing is also the light-sensitive cell which is located in a recess The appended drawings illustrate by way of example and without limitation specific embodiments of and a best mode for carrying out the invention.

In the drawings

Figure 1 is the perspective view of a photographic camera provided with a built-in electric exposure meter and a follow-up mark device, which is coupled with the shutter adjusting means and can be set to the pointer deflection of the exposure meter;

Figure 2 is the front view of a part of the broken away camera cap (on enlarged scale in comparison with Fig. 1);

Figure 3 is a top view of Fig. 2.

Referring now to the drawings in detail, the photographic camera 1 shown in the drawings has a camera cap 2 and a structural unit 3, which consists of an objective mount and a central shutter, an exposure value adjusting ring 4 being rotatably arranged on said unit. This ring is coupled with the shutter time adjutsing member and diaphragm adjusting member. The camera cap 2 has on its front side recesses for a finder window 5 and the light-sensitive cell 6 of an exposure meter. On its top side it has a kidney-shaped window 7, through which—as merely indicated in Fig. 1—the pointer 8 of the exposure meter and a follow-up mark 9, which can be moved by operation of ring 4, can be seen.

As shown in Figs. 2 and 3, the follow-up mark 9 is the free end of a lever arm 10, which is swingable about a pivot 11 seated in partition 12. Lever arm 10 is urged by a spring 13 wound around pivot 11, in which a manner that a pin 14 seated in arm 10 is permanently held in engagement with a control edge 15 of a control lever 16. This lever 16 is fastened by means of an adjusting or setting screw 17 to a shaft 18, which passes through partition 12 and carries on its other end a control arm 19, against which the end of a control pin 20—which is displaceably arranged in the objective mount—lies. The other end of this control pin lies against a control cam 21 connected with adjusting ring 4. A torsion spring 22 acts on shaft 18 in such a manner that, over control arm 19, control pin 20 is permanently held in engagement with control cam 21.

Upon turning adjusting ring 4, control pin 20 will be displaced and thereby causes turning of control arm 19, control lever 16 and—over pin 14—also lever arm 10 with follow-up mark 9. Thus, the follow-up mark mechanism shown is a fully operative structural unit and is built-in in the camera without mechanical or operative connection with the exposure meter.

The exposure meter and all necessary operative parts thereof are housed by a casing 23, which carries the light-sensitive cell 6 too. Casing 23 has a dustproof seal formed by transparent disc 24 which is arranged above the measuring instrument and through which pointer 8 can be seen. The path of movement of follow-up mark 9 extends above said disc 24. Casing 23 is fastened to camera body 1 by means of screws 25 in such a manner that the paths of movement of pointer 8 and follow-up mark 9 intersect each other in the range of deflection of pointer 8. The follow-up mark mechanism can then be adjusted to correct position after release of setting screw 17 by corresponding displacement of control lever 16 relative to shaft 18. Thereby, follow-up mark 9 can be adjusted relative to adjusting ring 4, or relative to exposure meter pointer 8. Thus, the only assembly operation to be carried out by the camera manufacturer in connection with the exposure meter, is the screwing on of casing 23 to the camera.

The recess provided in camera cap 2 for the light-sensitive cell 6, is open at the lower front edge of cap 2. Thus, it is possible to apply the camera cap 2 to the camera 1 from above. Thereby, the limiting edges 26 of said recess enter a registering groove 27 of mount 28 which carries cell 6, so that a tight seal between cap 2 and mount 28 results.

In the embodiment shown, the path of movement of the follow-up mark 9 follows a course above that of the exposure meter pointer. However, said mark 9 can be also caused to move in a plane below pointer 8.

It will be understood from the above that this invention is not limited to the specific designs, constructions, arrangements and other details specifically described above and illustrated in the drawings and can be carried out with various modifications without departing from the scope of the invention as defined in the appended claims.

In order to take a photographic picture, the above described camera must be held in such a manner that the photo-cell receives particularly the light rays incident from the scene of picture-taking. This results in a certain deflection of pointer 8 of the exposure meter. Ring 4 for adjustment of the exposure value must now be turned until the follow-up mark 9 reaches superposition with the deflected pointer 8. In this manner an exposure value corresponding to the light conditions in the respective case, will be adjusted. Coupled with ring 4 in the manner described in the co-pending patent application filed in the United States Patent Office in the name of Richard Sommer under Ser. No. 737,601, filed May 26, 1958, are the diaphragm adjusting means and time adjusting means of the shutter so that in each case a correct combination of diaphragm value and time value will be adjusted when the follow-up mark and the pointer of the exposure meter are in superposition.

What is claimed is:

1. A photographic camera comprising a camera body, means for adjusting the shutter time and the diaphragm, an electric exposure meter and a follow-up mark mechanism, and a structural unit which is fastened to the camera body and consists of an objective mount and an objective shutter and is provided with an exposure value adjusting ring coupled with the means for adjusting the shutter time and the diaphragm adjusting ring; a camera cap overlapping one longiutdinal narrow side of the camera; a casing fastened to the camera wall overlapped by said cap, said casing being provided with a mount for a light-sensitive cell and housing a measuring device having a pointer and being connected with said light-sensitive cell, said cell and said measuring device forming said electric exposure meter; a transparent disk for dustproof sealing of said casing; a window provided in the camera cap above said disk; said follow-up mark mechanism being arranged, structurally separated from said casing, on the camera wall overlapped by the camera cap, said mechanism being coupled with said exposure value adjusting ring and the follow-up mark being formed by the free end of a lever tiltably arranged on the camera body; that part of said lever, which carries the follow-up mark projecting into the space between the transparent disk and said window in such a manner that the follow-up mark can be brought to direct coincidence with said pointer in the range of said window.

2. A photographic camera as claimed in claim 1, comprising the lever carrying the follow-up mark in tiltable arrangement on a pivot fastened to the wall of the camera body, which is overlapped by the camera cap, in the range of the angle swept over by the exposure meter pointer, but beyond the path described by said pointer; the tip of the pointer and the free end of said lever, which carries the follow-up mark, being in confronted position; a control lever having a guiding edge and being fastened to a shaft; a spring acting on the lever carrying the follow-up mark in order to hold said lever in engagement by a pin provided on the lever, with said guiding edge; a control arm fastened to said shaft; a control pin axially displaceably arranged in the objective mount, one end of said control pin being in engagement with said control arm, while the other end of said control pin is in engagement with a control cam connected with the exposure value adjusting ring; a torsion spring acting on said shaft in order to hold said control pin, over said control arm, in permanent engagement with said control cam.

References Cited in the file of this patent
UNITED STATES PATENTS

| | | |
|---|---|---|
| 2,252,573 | Leitz et al. | Aug. 12, 1941 |
| 2,340,622 | Simmon | Feb. 1, 1944 |
| 2,341,393 | Simmon | Feb. 8, 1944 |